United States Patent [19]

Hanamoto et al.

[11] Patent Number: 5,113,279
[45] Date of Patent: May 12, 1992

[54] LASER BEAM SCANNING APPARATUS

[75] Inventors: Hiroyuki Hanamoto; Masaaki Oyabu, both of Aichi, Japan

[73] Assignee: Minolta Camera Kabushiki Kaisha, Osaka, Japan

[21] Appl. No.: 672,035

[22] Filed: Mar. 19, 1991

[30] Foreign Application Priority Data

| Mar. 19, 1990 [JP] Japan | 2-68936 |
| Mar. 20, 1990 [JP] Japan | 2-71296 |

[51] Int. Cl.$^5$ .................................. G02B 26/10
[52] U.S. Cl. .................................. 359/196; 359/217; 359/629; 359/204; 250/236; 346/108
[58] Field of Search ............... 359/204, 196, 212, 213, 359/214, 216, 217, 218, 219, 220, 221, 618, 629, 634, 639; 250/234, 235, 236, 578.1; 346/108, 160

[56] References Cited

U.S. PATENT DOCUMENTS

| 3,546,374 | 12/1970 | Graser, Jr. | 359/629 |
| 4,205,350 | 5/1980 | Gunning | 359/217 |
| 4,827,334 | 5/1989 | Johnson et al. | 359/629 |
| 4,950,888 | 8/1990 | Hamada | 250/236 |

FOREIGN PATENT DOCUMENTS

| 60-201319 | 10/1985 | Japan. |
| 2712 | 1/1991 | Japan | 359/204 |

Primary Examiner—Loha Ben
Attorney, Agent, or Firm—Price, Gess & Ubell

[57] ABSTRACT

A laser beam scanning apparatus for laser printers, digital copying machines and the like in which a plurality of laser beams are combined, the composite laser beam is deflected in the main scan direction and a part of the deflected composite laser beam enters an optical path at an SOS signal sensor, then the composite laser beam is split and directed to different parts of an exposure member. Although there is some mixing of one beam split from the composite beam with unsatisfactorily separated beam, the unsatisfactorily separated beam is further separated in the optical path to the exposure member, thus effectively preventing the occurrence of image ghosts on the exposure member.

23 Claims, 4 Drawing Sheets

LASER BEAM SCANNING APPARATUS

BACKGROUND OF THE INVENTION

1. Field of the Invention

The present invention relates to a laser beam scanning apparatus for use in image forming apparatus in laser printers, digital copying machines and the like, and more specifically relates to a laser beam scanning apparatus wherein a common optical system combines a plurality of laser beams.

2. Description of the Related Art

The image forming apparatus in printers, digital copiers and the like incorporate a laser beam scanning apparatus that modulates the luminance of a laser beam in accordance with the image signals, and exposes the laser beam on a photosensitive member, photographic film, screen or like exposure member.

The light source of a laser beam scanning apparatus uses a laser source capable of high-speed beam modulation and which can typically produce a very fine beam spot. While commonly known deflection means used to deflect the beam spot exposing the exposure member in the main scan direction typically include a rotatable polygonal mirror (multifaceted mirror), an oscillatable galvanomirror, a rotatable hologram and the like, the polygonal mirror is by far the most common deflection means inasmuch as the construction of such a mirror is much less complex than the others.

When the laser beam is deflected by the polygonal mirror, the scanning speed of the laser beam is proportional to the rotational speed of the polygonal mirror, such that the polygonal mirror may be rotated at high speed for high-speed scanning. In regard to the aforesaid high-speed scanning operation, the problems of motor durability and limitations of the material of the polygonal mirror must be overcome.

High-speed printers in particular use a plurality of laser beams modulated by respectively different image signals, such that the laser beams are simultaneously deflected so as to actually accomplish several high-speed scans by simultaneously scanning a plurality of parts on the exposure member.

On the other hand, the scanning apparatus provided in full-color printers and two-color (for example, black and red) printers expose two or more laser beams modulated by image signals corresponding to the images of the respective colors onto different parts of a single photosensitive member, or expose a plurality of photosensitive members by the respective laser beams so as to form a multicolor image.

The aforesaid type of scanning apparatus using a plurality of laser beams are typically constructed to commonly use a polygonal mirror and a lens so as to simplify construction and reduce cost, so that the plurality of laser beams are simultaneously deflected by the single polygonal mirror and projected by the single lens. Further, beam sensors are generally provided near the exposure member to determine the timing for the start of image modulation of the laser source. The laser beams deflected by the polygonal mirror passes through the beam sensors and scan the photosensitive member (exposure member).

An example of a laser beam scanning apparatus constructed so as to deflect a plurality of laser beams by means of a single polygonal mirror is an apparatus using a plurality of laser beams having respectively different characteristics (wavelength, the direction of the polarized and the like) which are combined to form a single beam that is deflected in the main scanning direction by a single deflection means, and thereafter split into a plurality of laser beams based their respective original characteristics, and each of the separated laser beams irradiate a different part of the exposure member.

For example, Japanese Unexamined Patent Application No. 60-201319 discloses a laser scanning apparatus for use in a color printer wherein the laser scanning apparatus first synthesizes or composes and then splits three laser beams having different wavelengths.

Disadvantages inherent to the previously described apparatus are described hereinafter. A first disadvantage is that the length of the separation mirror must be longer than the main scan direction of the exposure member so that the beam sensor can detect the beam because the beam sensor is disposed behind the separation mirror used to reseparate the plurality of deflected laser beam and guide the beams to the photosensitive member. Therefore the separation mirror is longer than necessary, and the overall size of the apparatus itself is enlarged.

A further disadvantage is that the wiring of the aforesaid apparatus is quite complex inasmuch as the beam sensor is arranged so as to be in a direction that is removed from the contro circuits that execute laser source illumination control.

A second disadvantage arises from the use of a dichroic mirror having a partially reflecting film that allows laser beams having certain characteristics to pass therethrough while reflecting laser beams having other characteristics. After the plurality of laser beams have been combined in a single beam and deflected, the dichroic mirror is used as a beam splitter to reseparate the plurality of laser beams according to their respective original characteristics.

The dichroic mirror comprises optical glass or like transparent material, the surface of which is coated with a partially reflecting film consisting of a dielectric multi-ply layer or a metal and dielectric multi-ply layer. Dichroic mirrors possess selectivity regarding wavelengths and the directions of the polarized of laser beams that are transmitted or reflected.

However, even a dichroic mirror having a partial reflective film possessing excellent selectivity cannot accomplish complete laser beam separation, and invariably produces some mixing of characteristics of one laser beam with the characteristics of another beam.

Therefore, a further disadvantage arises when each separated laser beam irradiates a different part of the surface of the exposure member in image formation, and the image formed at a particular part of the exposure member has superimposed thereon the image of a different part, which, when developed, results in the so-called "ghost" phenomenon.

SUMMARY OF THE INVENTION

A main object of the present invention is to provide an improved laser beam scanning apparatus for an optical system.

A further object of the present invention is to provide the aforesaid laser beam scanning apparatus without enlarging the size of the apparatus itself and without complicating the wiring arrangement of the laser beam source and the like.

A still further object of the present invention is to provide a laser beam scanning apparatus that is capable of forming high-quality images without producing image ghosts.

A first aspect of the present invention is that, in the laser beam scanning apparatus, a plurality of laser beams are modulated by image signals then combined by a synthesizing-splitting means, the composite laser beam is deflected in the main scan direction by a deflection means and thereafter the composite laser beam is reflected by a mirror toward the synthesizing-splitting means which splits the laser beams, whereupon the separated laser beams enter a beam detecting means that outputs SOS signals. In the aforesaid laser beam scanning apparatus, the plurality of laser sources, the synthesizing-splitting means, the deflecting means, and the laser beam detecting means may be disposed in mutual proximity so as to avoid complicated arrangements of the electrical system wiring and the like. The previously mentioned synthesizing-splitting means may take the form of a dichroic mirror. In addition, although single laser beams enter the laser beam sensor in the preceding description, a composite laser beam may enter the beam sensor if necessary.

A second aspect of the present invention is that composite laser beam deflected by the deflecting means is separated into light that is reflected by the beam splitting means and light that is transmitted through the beam splitting means so as to irradiate a plurality of parts of the exposure member and thereby irradiate different parts of the exposure member. When the composite laser beam is split there is some mixing of the beams inasmuch as one laser beam may be incompletely separated from another. By using a beam selecting means after the composite laser beam has been split, however, the proportion of inadequately separated beams is reduced, with the practical effect of preventing the occurrence of ghost images on the exposure member. More specifically, a dichroic mirror may be used as the aforesaid beam selection means.

These and other object, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
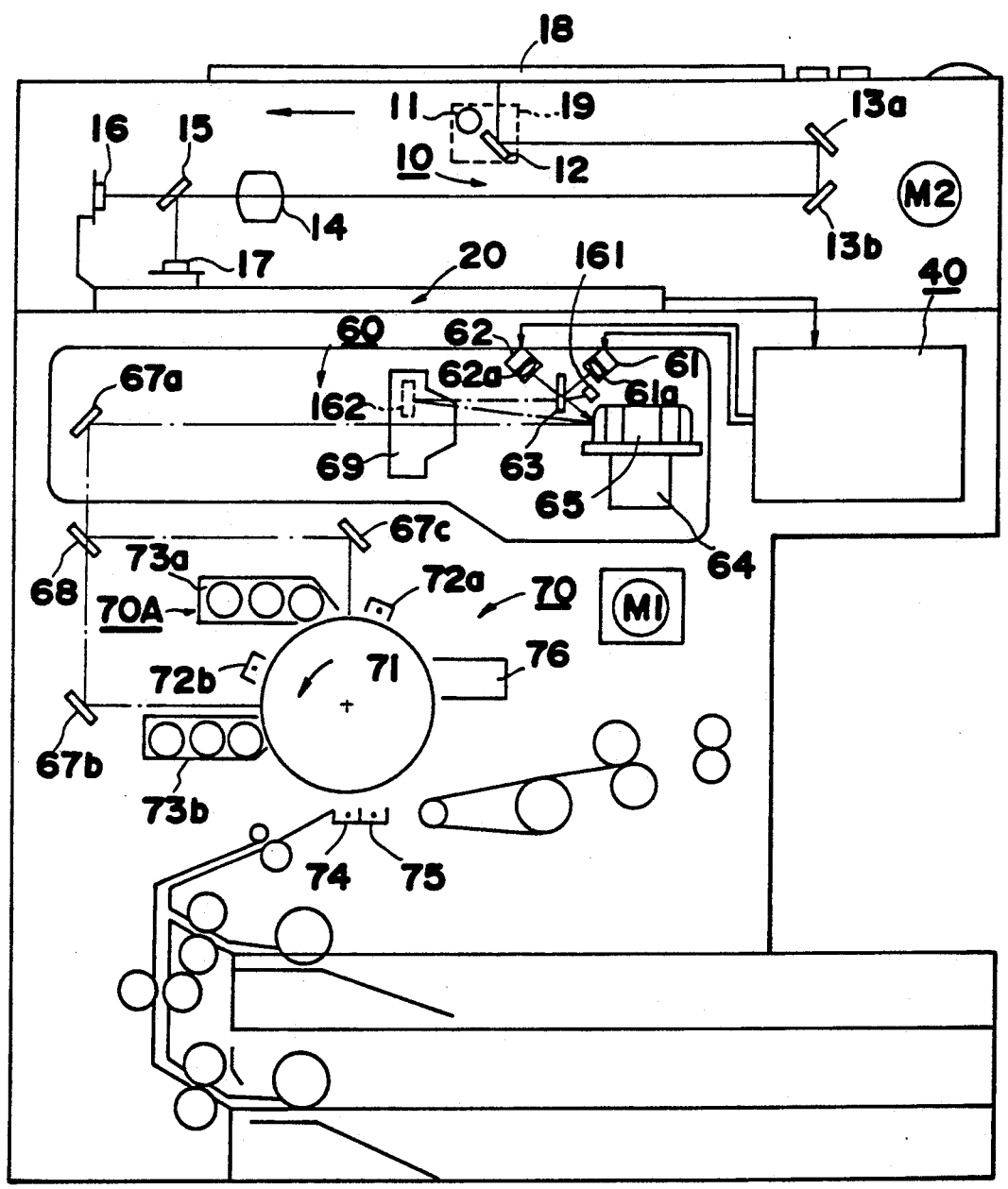
FIG. 1 is a side view in section showing the construction of a simultaneous two-color copying machine with the laser beam scanning apparatus of the present invention.

The preferred embodiments of the present invention are described hereinafter with reference to the accompanying drawings. FIG. 1 is a side view in section showing the construction of a simultaneous two-color copying machine with the laser beam scanning apparatus of the present invention installed in the optical system. This copying machine develops images by a reversal developing method, and comprises a scanning unit 10 for scanning original documents, an image signal processor 20 for processing image signals transmitted from the scanning unit, a printing processor 40 that outputs image data to a first semiconductor laser 61 and a second semiconductor laser 62 described later based on the processed image signals, an optical system 60 comprising the laser beam scanning apparatus of the present invention for irradiating the photosensitive drum 71 with the modulated light of two laser beams based on the image data, and an image forming unit 70 that develops an electrostatic latent image formed by the aforesaid irradiation and transfers and fixes the developed image on to a transfer member such as a paper sheet.

Scanning unit 10 scans the original document disposed on the document glass platen 18 and converts the light reflected from the document as a result of the scanning exposure into electronic signals in, for example, photoelectric conversion elements 16 and 17 which use CCD (charge-coupled device) arrays. The photoelectric conversion elements convert the image of a specific color such as red or the like, and the image of a different color such as black or the like into their respective electronic signals.

The scanning unit 10 is mounted on the scanner 19 that travels parallel to the document platen 18 by means of the scanner motor M2. The scanning unit 10 has an exposure lamp 11 for exposing the original document, a reflecting mirror 12 that modifies the direction of the light reflected from the original document, two mirrors 13a and 13b that modify the optical path from the reflecting mirror 12, a lens 14 for condensing the reflected light, a half mirror 15 that splits the reflected light from the document into reflecting light and transmitting light and sends the both lights to two photoelectric conversion elements 16 and 17, and photoelectric conversion elements 16 and 17 that generate electronic signals in accordance with the light input thereto. The scanning unit 10 scans the original document while the scanner 19 travels in a leftward direction as indicated by the arrow in the drawing.

The image signal processor 20 receives image signals that are transmitted from the two photoelectric conversion elements 16 and 17, normal image processing such as shading correction, magnification, dither processing and the like are accomplished, the specific color (red) and the different color are discriminated, and the information on the two colors is output as color information appended to the image data and transmitted to the print processing unit 40.

The print processing unit 40 divides the respective color information appended to the transmitted image data and routes the data to both the first semiconductor laser 61 and the second semiconductor laser 62, delays the image data sent to the second semiconductor laser 62 in accordance with the difference in exposure position of the first and second semiconductor lasers 61 and 62 on the photosensitive drum 71.

The optical unit 60 forms on the surface of the photosensitive drum 71 electrostatic latent images corresponding to the images of the specific color, which is red, and the different color black, which is black, formed by means of the laser beams emitted the first and second semiconductor lasers 61 and 62 of the laser light source.

The image forming unit 70 develops the electrostatic latent images formed on the photosensitive drum 71 and transfers the developed images to a sheet of paper and fixes the images thereon. The image forming unit 70 comprises a transfer unit 70A, a transporting unit 70B and a fixing unit 70C.

The developing and transfer unit 70A comprises a photosensitive drum 71 that is rotatably driven in the counterclockwise direction indicated by the arrow in the drawing, a first charger 72a, a first developing device 73a accommodating red color toner, a second charger 72b, a second developing device 73b accommodating black color toner, a transfer charger 74, a separation charger 75, a cleaning section 76, and the like.

Figure 2:
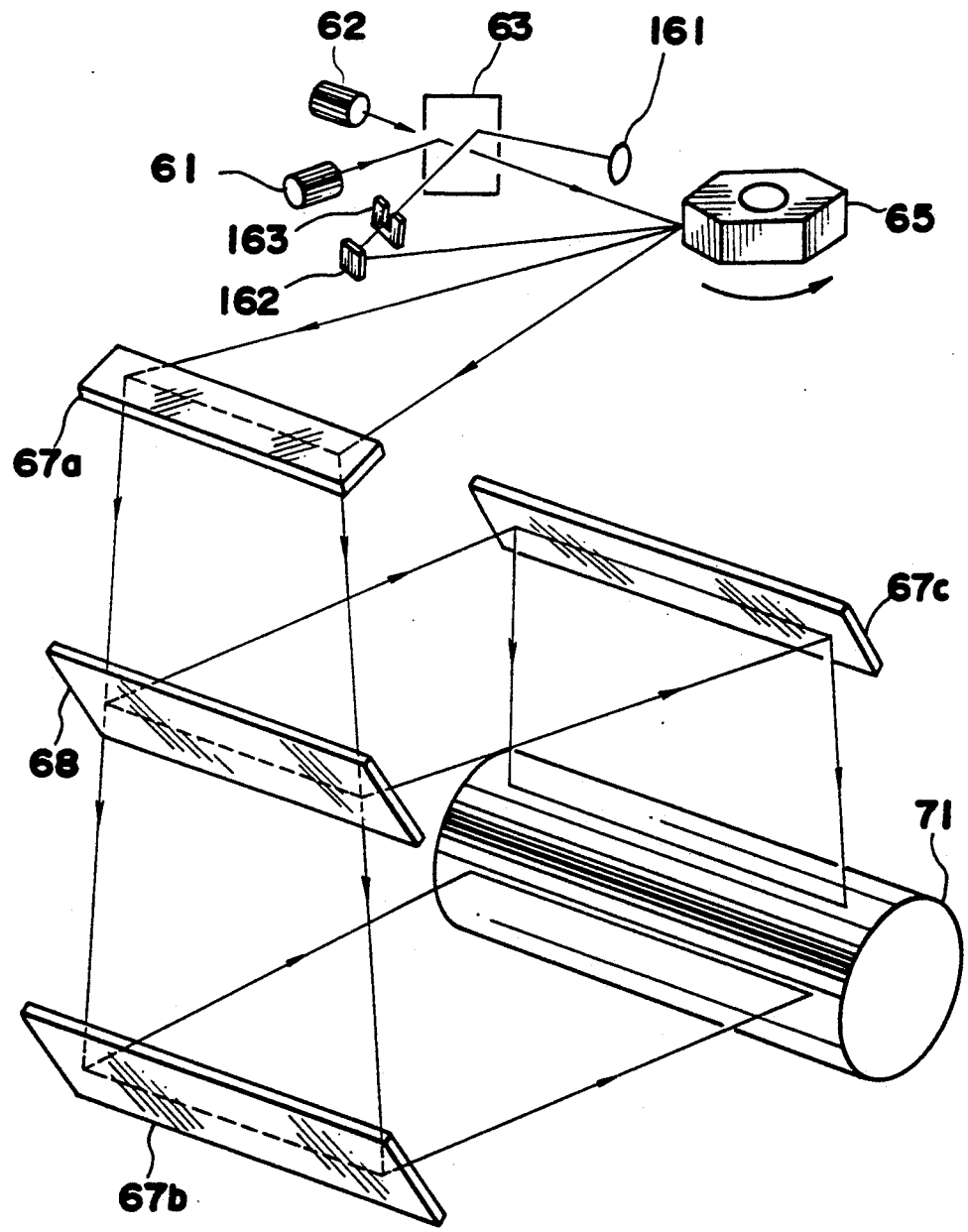
FIG. 2 is a perspective view showing a part of the construction of optical unit 60.

FIG. 2 is a perspective view showing a portion of the construction of the optical unit 60. The optical unit 60 comprises a first semiconductor laser 61 that emits a laser beam having a wavelength of 750 nm, a second semiconductor laser 62 that emits a laser beam having a wavelength of 810 nm, collimator lenses 61a and 62a that respectively collimate and render parallel the laser beams emitted by the first semiconductor laser 61 and the second semiconductor laser 62, a laser beam synthesizing-splitting mirror 63, a polygonal mirror 65 that deflects the composite laser beam in the main scan direction, a condensing lens 69 to condense the deflected laser beam, a reflecting mirror 162 to reflect the deflected composite laser beam, a slit 163 to restrict the reflected composite laser beam and project the beam to the beam synthesizing-splitting mirror 63, a beam sensor 161 that detects the laser beams split and reflected by the beam synthesizing-splitting mirror 63, a mirror 67a that reflects the condensed laser beam, a beam splitting mirror 68 that separates the composite laser beam into two beams and which has identical characteristics as the beam synthesizing-splitting mirror 63, a reflecting mirror 67b and a beam selecting mirror 67c having identical characteristics as the beam synthesizing-splitting mirror 63.

Figure 3:
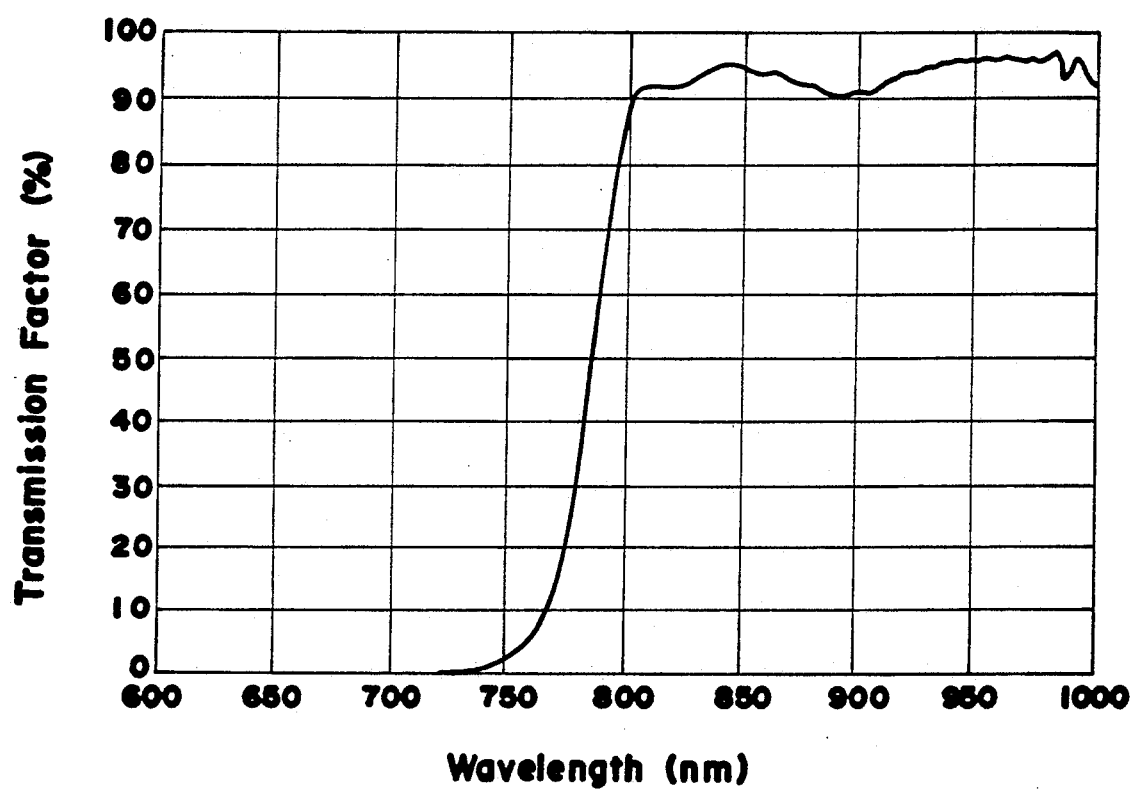
FIG. 3 is an illustration showing the wavelength selection characteristics of the dichroic mirror used in the first embodiment of the invention.

The beam synthesizing-splitting mirror 63 may be a dichroic mirror, the optical characteristics of which are shown in FIG. 3 which indicates that more than 95% of the 750 nm laser beam emitted by the first semiconductor laser 61 is reflected, while more than 90% of the 810 nm laser beam emitted by the second semiconductor laser 62 is transmitted. The beam sensor 161 outputs SOS signals timed by the reception of the laser beam, and the SOS signals determine the timing for the start of modulation of each laser beam according to the image data.

The print processor 40 outputs from a buffer (not shown in the drawing) the image data received from the image processor 20 in accordance with the SOS signals from the beam sensor 161, and outputs modulation signals modulated by the aforesaid image data to the first and second semiconductor lasers 61 and 62.

The first and second semiconductor lasers 61 and 62 independently generate laser beams modulated by the modulation signals output from the print processor 40 in accordance with the red and black images, and the respective laser beams are combined by th ®synthesizing-splitting mirror 63. In addition, the first and second semiconductor lasers 61 and 62 generate unmodulated laser light until modulated by the image data. The direction of the composite laser beam is modified by the polygonal mirror 65 which is rotatably driven in the arrow direction (FIG. 2) by the polygon motor 64 so as to scan the surface of the photosensitive drum 71 in the main scan direction (line direction). The composite laser beam prior to modulation is deflected and guided to the reflecting mirror 162, and after being reflected the direction of passage of the reflected beam is restricted by the slit 163, such that the beam does not scan excessively in the vicinity of the beam sensor 161. In the composite laser beam transmitted through the slit 163, the laser beam having a wavelength of 750 nm emitted by the first semiconductor laser 61 is reflected by the synthesizing-splitting mirror 63 and arrives at the beam sensor 161, while the laser beam having a wavelength of 810 nm emitted by the second semiconductor laser 62 passes through the synthesizing-splitting mirror 63. When the laser beam is detected by the beam sensor 161, a modulation signal is output from the print processor 40 at a specific timing to modulate the laser beam. After the modulated composite laser beam is deflected, the laser beam is condensed by the condensing lens 69 and is folded by the mirror 67a. Then, the composite laser beam is split into two beams by the beam splitting mirror 68 and the beams are respectively reflected by mirror 67b and beam selection mirror 67c provided in the respective optical paths, and the laser beams arrive at the respective exposure positions on the photosensitive drum 71 so as to irradiate said photosensitive drum 71.

Figure 4:
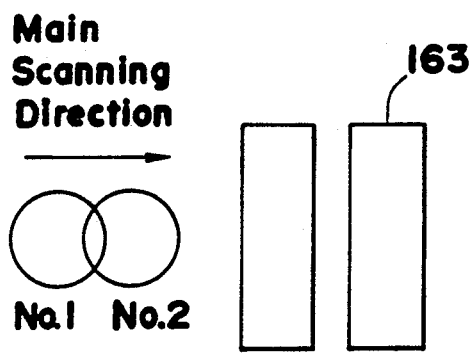
FIG. 4 is an illustration showing the state wherein a composite laser beam with dislocation between individual beams is transmitted through the slit 163.
Figure 5:
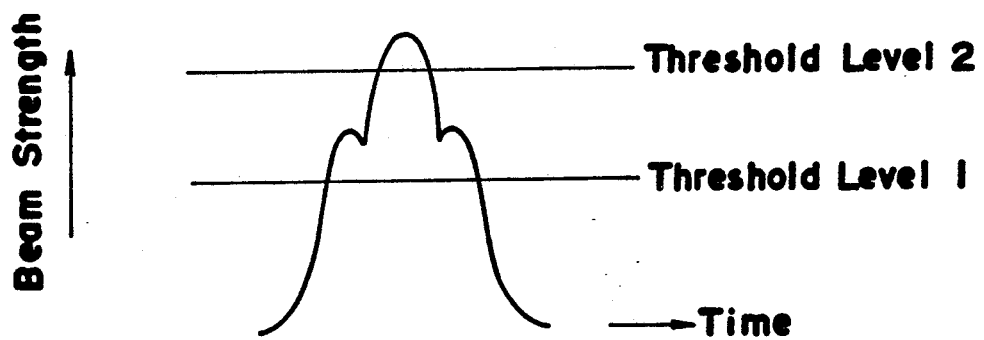
FIG. 5 is an illustration showing the waveform of the output signal from beam sensor 161 when the composite beam shown in FIG. 4 has entered beam sensor 161.

Although in the present invention the composite laser beam is split by the beam synthesizing-splitting mirror 63, and one beam (in the present embodiment, the beam having a wavelength of 750 nm) enters the beam sensor 161 to generate the SOS signals, the unseparated composite laser beam may be caused to enter the beam sensor 161 as long as there is no dislocation between the two individual laser beams in the composite beam. However, there is extreme difficulty in adjusting the arrangement of the two laser light sources 61 and 62 so as to avoid dislocation of the two beams within the composite laser beam. Further, if there is a dislocation of the beams within the composite beam and said composite laser beam enters the beam sensor 161, there is a possibility the beam sensor will be incapable of precision timing due to the mutual dislocation between each of the two individual beams. That is, when a composite laser beam having a dislocation as that shown in FIG. 4 (for example, the laser beam emitted by the first semiconductor laser 61 is designated No. 1 and the laser beam emitted by the second semiconductor laser 62 is designated No. 2) passes through the slit 163 and enters beam sensor 161, the beam sensor 161 outputs a waveform signal as shown in FIG. 5. In this case, if the threshold value in FIG. 5 is set at "1", the only problem of beam detection is the correction of the dislocation between the beams in a composite laser beam, and this correction can be achieved in the same way as in the detection of a single laser beam as explained hereinbelow. If the threshold value is set at a value of "2," however, the beam detection timing is disturbed, so that in addition to corrections between the individual laser beams, the threshold value must also be corrected as must the timing of the beam detection. Dislocation between laser beams in actual laser beam scanning devices differ from machine to machine, so that the correction of the dislocation between the laser beams and correction of the threshold value must be made for each individual machine.

In contrast, when beam detection concerns only a single laser beam, the beam entering the beam sensor 161 can be subjected to dislocation correction by a reference beam. Not only can dislocation between each of the split laser beams be electrically corrected, but accuracy can be achieved with an unsplit composite laser beam entering the beam sensor.

The laser beam having a wavelength of 750 nm emitted by the first semiconductor laser 61 is reflected by the beam splitting mirror 68 and bent by the beam selection mirror 67c so as to be guided to the photosensitive drum 71. On the other hand, the laser beam having a wavelength of 810 nm emitted by the second semiconductor laser 62 is transmitted through the beam splitting mirror 68 and bent by mirror 67b so as to arrive at the photosensitive drum 71.

Complete laser beam separation cannot be accomplished by the beam splitting mirror 68. As can be readily understood from the graph shown in FIG. 3, the laser beam having a wavelength of 810 nm is transmitted with an intensity of over 90% while the remaining weak 10% of the beam is unsatisfactorily separated and reflected just as the laser beam having a wavelength of 750 nm. Conversely, the laser beam having a wavelength of 750 nm is more than 95% reflected, while the remaining weak 5% of the beam is unsatisfactorily separated and transmitted just as the laser beam having a wavelength of 810 nm. There is some polarization in the wavelength selection characteristics of the beam splitting mirror 68. A comparison of the portions of the 750 nm wavelength laser beam and the 810 nm wavelength laser beam that are unsatisfactorily separated by the beam splitting mirror 68 discloses that the 810 nm wavelength laser beam has a high proportion of unsatisfactorily separated light. The probability that the aforesaid high proportion of unsatisfactorily separated laser beam will produce image ghosts on the photosensitive drum 71 becomes quite high in the portion of the optical path conducting the 750 nm wavelength laser beam. In the present invention, the occurrence of image ghosts is prevented by providing a dichroic mirror as the beam selection mirror 67c in the optical path for the laser beam of 750 nm wavelength, while conventionally said mirror would be an all-reflecting mirror.

The beam selection mirror 67c has wavelength characteristics identical to those of the beam splitting mirror 68. Accordingly, the intensity of the unsatisfactorily separated 810 nm wavelength laser beam reflected by the beam selection mirror 67c is only 10% of the intensity of the beam reflected by the beam splitting mirror 68, thereby effectively preventing the ghost phenomenon.

Further, due to the previously described polarization in the wavelength characteristics of the beam splitting mirror 68 used in the present embodiment, the intensity of the unsatisfactorily separated 750 nm wavelength laser beam is a mere 5%, thereby effectively preventing any image ghosts induced by the unsatisfactorily separated 750 nm wavelength laser beam.

Although the invention has been described in the present embodiment as a laser beam scanning apparatus used in a simultaneous two-color copying machine, the present invention is not limited to this application, and can be adapted for use in multi-color image forming apparatus such as color laser printers, laser displays and the like.

In addition, the present invention is not limited to synthesizing and splitting laser beams by light wavelength using dichroic mirrors having identical wavelength characteristics as the beam synthesizing-splitting means, beam splitting means and beam selection means as described in the preferred embodiment, but such effects may be accomplished by using other optical means such as prisms as the aforesaid beam synthesizing-splitting means, beam splitting means and beam selection means.

While the preferred embodiment of the invention has been described as synthesizing and splitting a composite laser beam comprising two laser beams having different wavelengths which are respectively emitted from two different laser light sources, the composite laser beam synthesizing and splitting may be accomplished using laser beams wherein the directions of the polarized light are different. Further, when three or more laser beams are used, and the wavelengths of two beams are equal while their polarization directions are different, the characteristics of the individual laser beams can be suitably set so as to use the two beams having identical wavelengths and different polarization directions and the third beam having a wavelength different from the other two beams. In such a case, the beam selection characteristics can be selectively set by modifying the material, thickness and number of laminate layers of the dielectric layers forming each part of the partial reflective film in accordance with the characteristics of the laser beam being used.

The laser light source is not limited to the semiconductor laser described in the preferred embodiment, but may also be a solid state laser, gas laser or liquid laser.

Image ghosts occur on the photosensitive drum 71 in the part of the optical path conducting the 810 nm wavelength laser beam due to the unsatisfactorily separated part of the 750 nm wavelength laser beam depending on the selection of the photosensitive member. At this time, the unsatisfactorily separated part of the 750 nm laser beam can be split from the main beam by providing a dichroic mirror having the same characteristics as described in the preferred embodiment such that said dichroic mirror is disposed between the beam splitting mirror 68 and mirror 67b, thereby preventing the occurrence of image ghosts. The aforesaid new dichroic mirror is of course to be positioned so that the resplit 750 nm wavelength laser beam does not produce adverse affects on the photosensitive drum 71.

The occurrence of image ghosts due to the unsatisfactorily separated part of the 750 nm wavelength laser beam can be prevented even when a dichroic mirror is used at mirror 67b which has a partial reflective film with characteristics opposite to the characteristics of the partial reflective film of the dichroic mirror 68.

According to the present invention, the occurrence of image ghosts produced by the affects of the unsatisfactorily separated part of one laser beam on another laser beam that arises when a composite laser beam is split is reduced to a level which eliminates the problem of image ghosts from a practical standpoint, and allows the formation of high quality images. Further, the present invention utilizes a beam synthesizing-splitting means, a beam splitting means and a beam selection means which all have optical components with identical optical properties, thereby improving the mass producibility of the apparatus and reducing costs compare with apparatus which use optical components having different optical characteristics.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning apparatus comprising:
   a plurality of laser beam sources for emitting laser beams modulated by image signals and having different characteristics from each other;
   beam composition optical means for composing the beams emitted from said plurality of laser beam sources to form composite laser beam;
   beam deflecting means for deflecting the composite laser beam in a main scanning direction thereof;
   beam detecting means, arranged near said plurality of laser beam sources, for detecting the deflected laser beam to determine each start timing of the modulation of each laser beam source;
   reflecting means for reflecting the deflected laser beam toward said beam detecting means; and
   beam splitting optical means for splitting the deflected composite laser beam into a plurality of laser beams on the basis of the characteristics of the laser beams;
   wherein each split laser beam is directed to a different part of a photosensitive member.

2. A laser beam scanning apparatus as claimed in claim 1, wherein said beam composition optical means and said beam splitting optical means include partial reflective films, respectively, which transmit the laser beam with a specified characteristic and reflect the laser beam with a characteristic different from that of the transmitted laser beam.

3. A laser beam scanning apparatus as claimed in claim 2, wherein said partial reflective film of said beam splitting optical means has the same optical characteristic as that of said beam composition optical means.

4. A laser beam scanning apparatus as claimed in claim 3, wherein said beam composition optical means and said beam splitting optical means are dichroic mirrors.

5. A laser beam scanning apparatus comprising:
   a plurality of laser beam sources for emitting laser beams modulated by image signals and having different characteristics from each other;
   beam composition-splitting optical means for composing the beams emitted from said plurality of laser beam sources to form composite laser beam and for splitting the composite laser beam entered therein into said plurality of laser beams;
   beam deflecting means for deflecting the composite laser beam in a main scanning direction thereof;
   reflecting means for reflecting the deflected composite laser beam to the beam composition-splitting means;
   beam detecting means for detecting one laser beam split by said beam composition-splitting optical means to determine each start timing of the modulation of each laser beam source; and
   beam splitting optical means for splitting the deflected composite laser beam into a plurality of the laser beams on the basis of the characteristics of the laser beams;
   wherein each split laser beam is directed to a different part of a photosensitive member.

6. A laser beam scanning apparatus as claimed in claim 5, wherein said beam composition-splitting optical means and said beam splitting optical means include partial reflective films, respectively, which transmit the laser beam with a specified characteristic and reflect the laser beam with a characteristic different from that of the transmitted laser beam.

7. A laser beam scanning apparatus as claimed in claim 6, wherein said partial reflective film of said beam splitting optical means has the same optical characteristic as that of said beam composition-splitting optical means.

8. A laser beam scanning apparatus as claimed in claim 7, wherein said beam composition-splitting optical means and said beam splitting optical means are dichroic mirrors.

9. A laser beam scanning apparatus comprising:
   a plurality of laser beam sources for emitting laser beams modulated by image signals and having different characteristics from each other;
   beam composition optical means for composing the beams emitted from said plurality of laser beam sources to form composite laser beam;
   beam deflecting means for deflecting the composite laser beam in a main scanning direction thereof;
   beam splitting optical means for splitting the deflected composite laser beam into a plurality of laser beams on the basis of the characteristics of the laser beams; and
   beam selecting optical means, arranged between said beam splitting optical means and a photosensitive member on an optical path of the beam, for selecting one laser beam with the specific characteristic to direct said laser beam toward the photosensitive member;
   wherein each split laser beam is directed to a different part of the photosensitive member.

10. A laser beam scanning apparatus as claimed in claim 9, wherein said beam composition optical means, said beam splitting optical means and said beam selecting optical means include partial reflective films, respectively, which transmit the laser beam with a specific characteristic and reflect the laser beam with a characteristic different from that of the transmitted laser beam.

11. A laser beam scanning apparatus as claimed in claim 10, wherein each of said partial reflective films of said beam splitting optical means and said beam selecting optical means has the same optical characteristic as that of said beam composition optical means.

12. A laser beam scanning apparatus as claimed in claim 11, wherein said beam composition optical means, said beam splitting optical means and beam selecting optical means are dichroic mirrors.

13. A laser beam scanning apparatus comprising:
   a plurality of laser beam sources for emitting laser beams modulated by image signals and having different characteristics from each other;
   beam composition optical means for composing the beams emitted from said plurality of laser beam sources to form composite laser beam;
   beam deflecting means for deflecting the composite laser beam in a main scanning direction thereof;
   beam detecting means, arranged near said plurality of laser beam sources, for detecting the deflected laser beam to determine each start timing of modulation of each laser beam source;

beam splitting optical means for splitting the deflected composite laser beam into a plurality of laser beams on the basis of the characteristics of the laser beams; and beam selecting optical means, arranged between said beam splitting optical means and a photosensitive member on an optical path of the beam, for selecting one laser beam with the specific characteristic to direct said laser beam toward the photosensitive member;

wherein each split laser beam is directed to a different part of the photosensitive member.

14. A laser beam scanning apparatus as claimed in claim 13, wherein said beam composition optical means, said beam splitting optical means and said beam selecting optical means include partial reflective films, respectively, which transmit the laser beam with a specified characteristic and reflect the laser beam with a characteristic different from that of the transmitted laser beam.

15. A laser beam scanning apparatus as claimed in claim 14, wherein each of said partial reflective films of said beam splitting optical means and said beam selecting optical means has the same optical characteristic as that of said beam composition optical means.

16. A laser beam scanning apparatus as claimed in claim 15, wherein said beam composition optical means, said beam splitting optical means and said beam selecting optical means are dichroic mirrors.

17. A laser beam scanning apparatus comprising:
a plurality of laser beam sources for emitting laser beams modulated by image signals and having different characteristics from each other;

beam composition-splitting optical means for composing the beams emitted from said plurality of laser beam sources to form composite laser beam and for splitting the composite laser beam entered therein into said plurality of laser beams;

beam deflecting means for deflecting the composite laser beam in a main scanning direction thereof;

reflecting means for reflecting the deflected composite laser beam to the beam composition-splitting means;

beam detecting means for detecting one laser beam split by said beam composition-splitting optical means to determine each start timing of the modulation of each laser beam source;

beam splitting optical means for splitting the deflected composite laser beam into a plurality of laser beams on the basis of the characteristics of the laser beams; and beam selecting optical means, arranged between said beam splitting optical means and a photosensitive member on an optical path of one laser beam, for selecting one laser beam with the specific characteristic to direct said laser beam toward the photosensitive member;

wherein each split laser beam is directed to a different part of the photosensitive member.

18. A laser beam scanning apparatus as claimed in claim 17, wherein said beam composition-splitting optical means, said beam splitting optical means and said beam selecting optical means include partial reflective films, respectively, which transmit the laser beam with a specified characteristic and reflect the laser beam with a characteristic different from that of the transmitted laser beam.

19. A laser beam scanning apparatus as claimed in claim 18, wherein each of said partial reflective films of said beam splitting optical means and said beam selecting optical means has the same optical characteristic as that of said beam composition splitting optical means.

20. A laser beam scanning apparatus as claimed in claim 19, wherein said beam composition-splitting optical means, said beam splitting optical means and beam selecting optical means are dichroic mirrors.

21. A laser beam scanning apparatus, in which two laser beams simultaneously scan a member at different points from each other, comprising:
two laser beam sources for respectively emitting laser beams modulated by image signals, each laser beam having different optical characteristic from the other;

beam deflecting means for deflecting a laser beam in a main scanning direction;

first optical means, provided between two laser beam sources and said beam deflecting means, for composing said two laser beams to form composite laser beam;

second optical means for splitting said composite laser beam into said two laser beams so that each laser beam is directed to a different direction;

third optical means for guiding one laser beam toward the member; and fourth optical means for guiding another laser beam toward the member at a point different form that of said one laser beam, said fourth optical means having a characteristic which eliminates said one laser beam from the laser beam entered therein.

22. A laser beam scanning apparatus as claimed in claim 21, wherein said first, second and fourth optical means are dichroic mirrors having the same optical characteristics.

23. A laser beam scanning apparatus, in which two laser beams are synthesized in a single laser beam and the single laser beam is deflected by a single polygonal mirror, comprising:
two laser beam sources for respectively emitting laser beams modulated by image signals, each laser beam having different optical characteristic from the other;

first dichroic mirror for synthesizing said two laser beams in a single composite laser beam;

second dichroic mirror for splitting the deflected laser beam into two laser beams on the basis of the characteristics of the laser beams, third dichroic mirror for guiding one laser beam toward a photosensitive member; and fourth dichroic mirror for guiding another laser beam toward the photosensitive member at a point different from that of said one laser beam, wherein each of said third and fourth dichroic mirrors has a characteristic which removes unnecessary beam from the laser beam split by said second dichroic mirror.

* * * * *